(12) United States Patent
Mei et al.

(10) Patent No.: US 11,627,696 B2
(45) Date of Patent: Apr. 18, 2023

(54) DRIP IRRIGATION TREATMENT DEVICE FOR RECHARGING DOMESTIC SEWAGE INTO FARMLAND

(71) Applicant: Institute of Environment and Sustainable Development in Agriculture, CAAS, Beijing (CN)

(72) Inventors: Xurong Mei, Beijing (CN); Lili Gao, Beijing (CN); Daozhi Gong, Beijing (CN); Weiping Hao, Beijing (CN); Haoru Li, Beijing (CN); Weihua Han, Beijing (CN); Haibin Sun, Beijing (CN)

(73) Assignee: INSTITUTE OF ENVIRONMENT AND SUSTAINABLE DEVELOPMENT IN AGRICULTURE, CAAS, Beijing (CN)

( * ) Notice: Subject to any disclaimer, the term of this patent is extended or adjusted under 35 U.S.C. 154(b) by 0 days.

(21) Appl. No.: 17/722,041

(22) Filed: Apr. 15, 2022

(65) Prior Publication Data
US 2022/0394916 A1 Dec. 15, 2022

(30) Foreign Application Priority Data
Jun. 15, 2021 (CN) .......................... 202110661478.9

(51) Int. Cl.
| | |
|---|---|
| A01C 23/04 | (2006.01) |
| B01F 27/112 | (2022.01) |
| A01C 23/00 | (2006.01) |
| A01G 25/00 | (2006.01) |
| C02F 1/00 | (2023.01) |
| B01F 101/00 | (2022.01) |

(52) U.S. Cl.
CPC .......... *A01C 23/047* (2013.01); *A01C 23/008* (2013.01); *A01G 25/00* (2013.01); *B01F 27/112* (2022.01); *C02F 1/004* (2013.01); *C02F 1/006* (2013.01); *B01F 2101/305* (2022.01)

(58) Field of Classification Search
None
See application file for complete search history.

(56) References Cited

U.S. PATENT DOCUMENTS

| | | | |
|---|---|---|---|
| 2011/0162964 A1* | 7/2011 | Freydina | C02F 1/008 204/632 |
| 2011/0284376 A1* | 11/2011 | Ng | B01D 61/54 204/520 |

* cited by examiner

*Primary Examiner* — Richard C Gurtowski
(74) *Attorney, Agent, or Firm* — Ditthavong, Steiner & Mlotkowski

(57) ABSTRACT

A drip irrigation treatment device, which comprises a water storage tank, wherein a partition plate is arranged in the water storage tank and divides the interior of the water storage tank into a conveying cavity and a purifying cavity, one side of the conveying cavity and one side of the purifying cavity are jointly connected with a first water conveying mechanism, a protection box is arranged on one side of the water storage tank, a filter box is arranged in the protection box, one side of the upper end of the protection box is connected with a sewage conveying pipe, the lower end of the sewage conveying pipe corresponds to the filter box, a filtering mechanism is arranged in the filter box, a buffer moving mechanism is arranged on the periphery of the filter box, and a rotating mechanism is arranged on one side in the protection box.

6 Claims, 7 Drawing Sheets

DRIP IRRIGATION TREATMENT DEVICE FOR RECHARGING DOMESTIC SEWAGE INTO FARMLAND

CROSS REFERENCE TO RELATED APPLICATION

This patent application claims the benefit and priority of Chinese Patent Application No. 202110661478.9, filed on Jun. 15, 2021, the disclosure of which is incorporated by reference herein in its entirety as part of the present application.

TECHNICAL FIELD

The present disclosure relates to the technical field of rural domestic sewage treatment, in particular to a drip irrigation treatment device for recharging domestic sewage into farmland.

BACKGROUND ART

At present, in rural areas, domestic sewage is usually directly discharged into drainage ditches through sewers after being treated, so that water resource waste is easily caused, the surrounding ecological environment is polluted, and the air quality is reduced. Along with continuous development of new rural area construction, all equipment suitable for rural area development continuously appears. However, at present, no equipment capable of reasonably and effectively utilizing rural domestic sewage is applied to rural reformation and development, so that a drip irrigation treatment device for recharging domestic sewage into farmland is provided to solve the problem.

SUMMARY

The present disclosure aims to solve the defects in the prior art, and provides a drip irrigation treatment device for recharging domestic sewage into farmland.

In order to achieve the above purpose, the present disclosure adopts the following technical scheme:

A drip irrigation treatment device for recharging domestic sewage into farmland comprises a water storage tank, wherein a partition plate is arranged in the water storage tank and divides the water storage tank into a conveying cavity and a purifying cavity, one side of the conveying cavity and one side of the purifying cavity are jointly connected with a first water conveying mechanism, a protection box is arranged on one side of the water storage tank, a filter box is arranged in the protection box, one side of the upper end of the protection box is connected with a sewage conveying pipe, the lower end of the sewage conveying pipe corresponds to the filter box, a filtering mechanism is arranged in the filter box, a buffer moving mechanism is arranged on the periphery of the filter box, a rotating mechanism is arranged on one side in the protection box and connected with the protection box, stirring equipment is mounted at the upper end of the protection box, the lower end of the stirring device extends into the filter box, one end of the first water conveying mechanism is connected to one side of the filter box, one side of the conveying cavity is connected with a second water conveying mechanism, and one end of the second water conveying mechanism is connected with drip irrigation equipment.

Preferably, the first water conveying mechanism comprises bent pipes connected to one side of the conveying cavity and one side of the purifying cavity, one end of each of the two bent pipes is jointly connected with a three-way connector, one end of the three-way connector is connected with a second water pump through a second connecting pipe, one end of the second water pump is connected with a hose, and one end of the hose penetrates through the side wall of the protection box and is connected to one side of the filter box.

Preferably, the rotating mechanism comprises a rotating rod rotationally connected to one side of the protection box, a second driving motor is mounted on one side of the protection box, the tail end of an output shaft of the second driving motor is connected to one end of the rotating rod through a coupler, two limiting convex blocks are fixedly arranged on the rotating rod in a sleeving mode, two transverse rods are fixed to one side of the filter box, a fixed part is fixed to one end of the transverse rod, a rotating wheel is rotationally connected to the fixed part, and the limiting convex block on the same side abuts against one side of the rotating wheel on the same side.

Preferably, the buffer moving mechanism comprises connecting blocks fixed to the two sides of the filter box, a sliding block is fixed to one side of the connecting block, guide rails are arranged on opposite side walls in the protection box, the sliding block on the same side is mounted on the guide rail on the same side, a fixed plate is fixed between the opposite side walls in the protection box, two guide rods are fixed to one side of the filter box, the guide rods penetrate through the fixed plate and extend to one side of the fixed plate, the guide rod is sleeved with a spring, one end of the spring abuts against one side of the fixed plate, and the other ends of the springs abut against one side of the filter box.

Preferably, the stirring equipment comprises a first driving motor fixed at the upper end of the protection box, the tail end of an output shaft of the first driving motor is connected with a stirring rod, the lower end of the stirring rod penetrates through the side wall of the protection box and extends into the filter box, and a plurality of stirring blades are fixed on the side wall of the periphery of the stirring rod at equal intervals.

Preferably, the filtering mechanism comprises two baffle plates fixed between opposite side walls in the filter box, the two baffle plates divide the interior of the filter box into a filtering cavity, a mounting cavity and a stirring cavity, a first filter screen and a second filter screen are fixed between opposite side walls in the filtering cavity, a third water pump is mounted in the mounting cavity, one end of the third water pump is connected to one side of the filtering cavity, and the other end of the third water pump is connected to one side of the stirring cavity.

Preferably, the second water conveying mechanism comprises a third connecting pipe connected to one side of the conveying cavity, one end of the third connecting pipe is connected with a first water pump, and one end of the first water pump is connected with a first connecting pipe.

Preferably, the drip irrigation equipment comprises a fixed pipe connected to one end of the first connecting pipe, one end of the fixed pipe is in threaded sleeve connection with a plurality of spray pipes at equal intervals, one end of each of the spray pipes is in threaded sleeve connection with a connector, one end of the connector is in threaded sleeve connection with another spray pipe, one end of the spray pipe is in threaded sleeve connection with a closed connector, and a plurality of spray holes are formed in the spray pipe at equal intervals.

Preferably, clamping blocks are fixed to four corners of the lower end of the protection box respectively, an opening is formed in one side of the clamping block, a supporting block is arranged in the opening in a penetrating mode, a cushion block is fixed to the lower end of the supporting block, a plurality of mounting holes are formed in one side of the supporting block at equal intervals, a bolt is arranged on one side of the clamping block in a penetrating mode, and one end of the bolt extends into one of the mounting holes.

Preferably, a sealing cover is hinged to one side of the upper end of the protection box, a handle is fixed to the upper end of the sealing cover, a feeding cover is hinged to the other side of the upper end of the protection box, the lower end of the feeding cover corresponds to the stirring cavity, a sand filter layer is arranged in the purifying cavity, and a drainage pipe is connected to one side of the purifying cavity.

In the present disclosure, when domestic sewage needs to be treated, domestic sewage in main pipelines is fed into the filtering cavity in the filter box, large particles and small impurities are blocked and isolated respectively through full filtration of the first filter screen and the second filter screen, and then water with the impurities filtered out is fed into the stirring cavity through the third water pump; the first driving motor is started, the first driving motor drives the stirring rod and stirring blades to rotate through rotation of the output shaft; meanwhile, the feeding cover is opened, a corresponding sewage purifying agent is fed for full mixing and stirring, stirring is carried out for 30-50 minutes, the second driving motor drives the rotating rod to rotate through rotation of the output shaft while stirring and filtering through the filter screens are carried out, then the two limiting convex blocks are driven to rotate, and the rotating wheels are driven to rotate along with continuous rotation of the limiting convex blocks; due to the fact that the limiting convex blocks are in the mode that one end of on limiting convex block is long and the other end of the other limiting convex block is short; therefore, under continuous rotation, the filter box can be driven to move in a reciprocating mode, the second water pump is started to convey purified water; when corresponding crops need to be irrigated, the closed valve on one bent pipe is opened, the other bent pipe is closed, water flows into the conveying cavity, then the water is conveyed into the corresponding spray pipe through the first water pump, the mounting length of the spray pipe is selected according to the needs of crops, then drip irrigation is carried out, and when the crops do not need to be irrigated, the water source is put into the purifying cavity; and the sand filter layer in the purifying cavity adsorbs and filters the water source again, and then water is discharged into three types of surface water which is discharged into the rivers for backflow.

According to the drip irrigation treatment device, the rural residual domestic sewage can be effectively filtered and purified and can be recycled, crops can be reasonably irrigated, and the rural residual domestic sewage can be used as three types of surface water to flow back into rivers when the rural residual domestic sewage is not used, so that the rural ecological environment is guaranteed, water resources are greatly saved, and sustainable development is achieved.

Reference signs: 1, sealing cover; 2, sewage conveying pipe; 3, first driving motor; 4, protection box; 5, feeding cover; 6, second driving motor; 7, fixed pipe; 8, first connecting pipe; 9, first water pump; 10, spray pipe; 11, hose; 12, second water pump; 13, second connecting pipe; 14, three-way connector; 15, closed valve; 16, bent pipe; 17, water storage tank; 18, drainage pipe; 19, third connecting pipe; 20, partition plate; 21, connector; 22, spray hole; 23, stirring rod; 24, stirring blade; 25, fixed plate; 26, guide rod; 27, spring; 28, first filter screen; 29, filter box; 30, second filter screen; 31, baffle plate; 32, guide rail; 33, sliding block; 34, connecting block; 35, rotating wheel; 36, limiting convex block; 37, rotating rod; 38, third water pump; 39, transverse rod; 40, fixed part; 41, handle; 42, supporting block; 43, bolt; 44, mounting hole; and 45, closed connector.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure.

Figure 1:
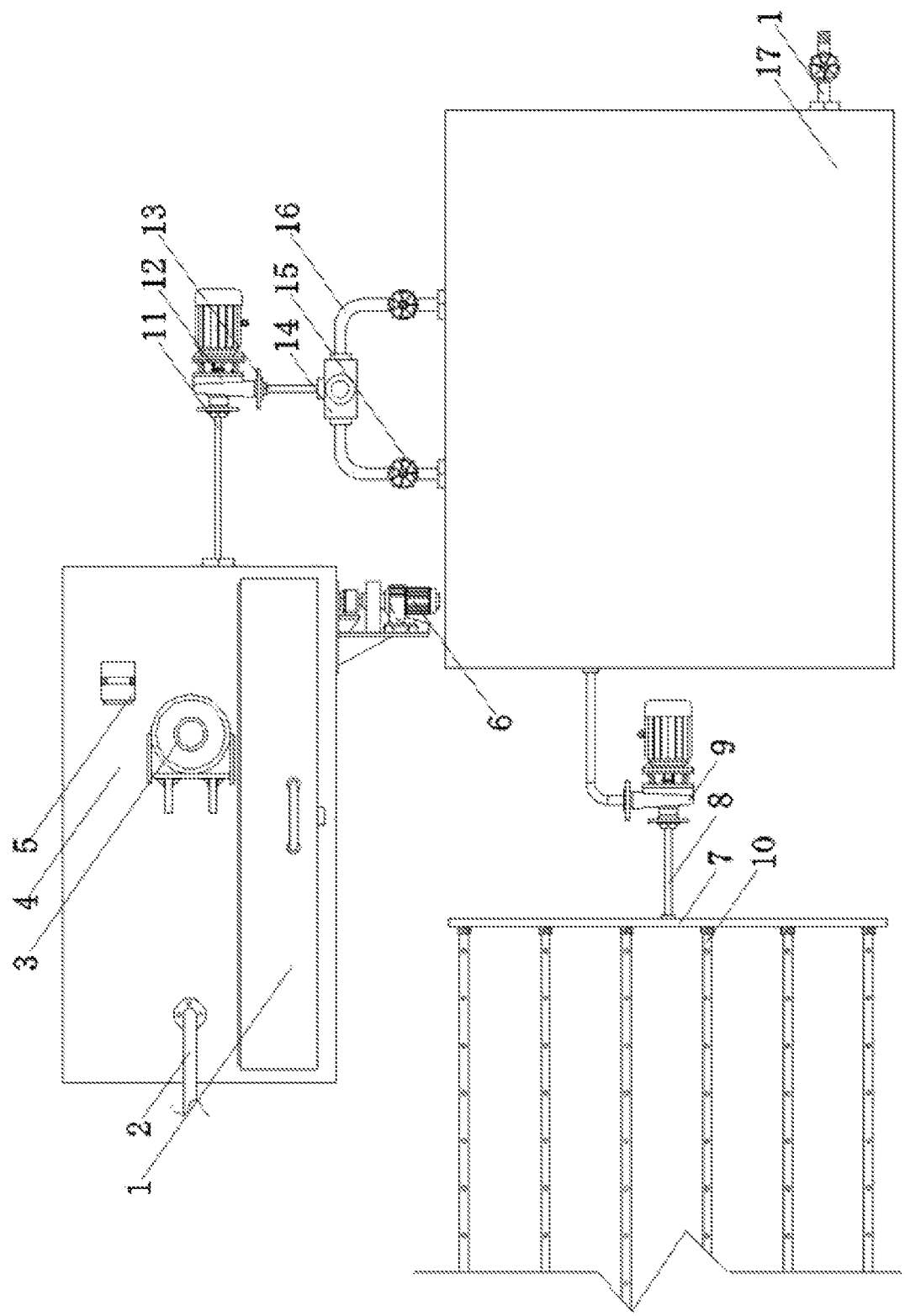
FIG. 1 is a structural schematic diagram of a drip irrigation treatment device for recharging domestic sewage into farmland proposed by the present disclosure.
Figure 2:
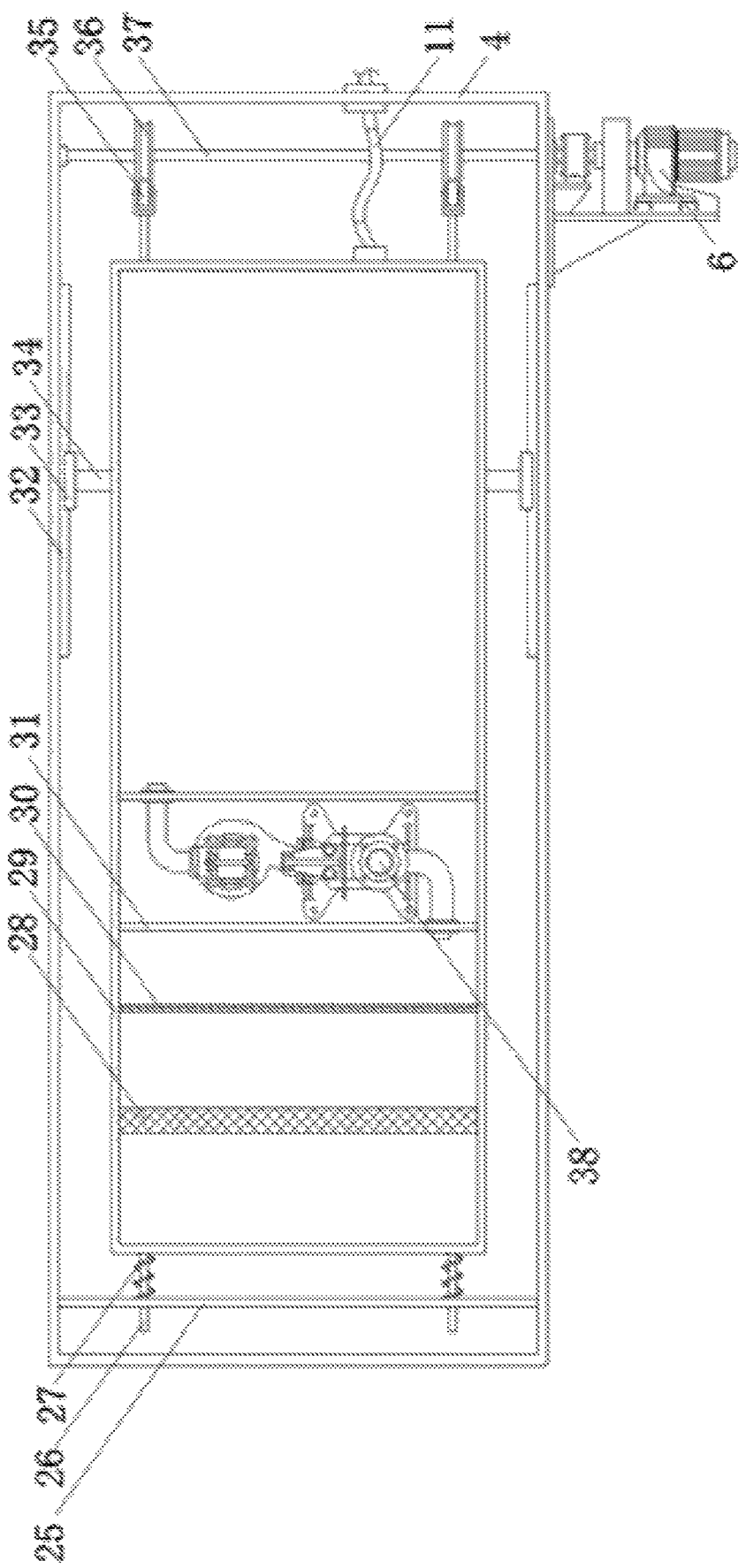
FIG. 2 is a schematic diagram of the internal structure of a protection box of a drip irrigation treatment device for recharging domestic sewage into farmland proposed by the present disclosure.
Figure 3:
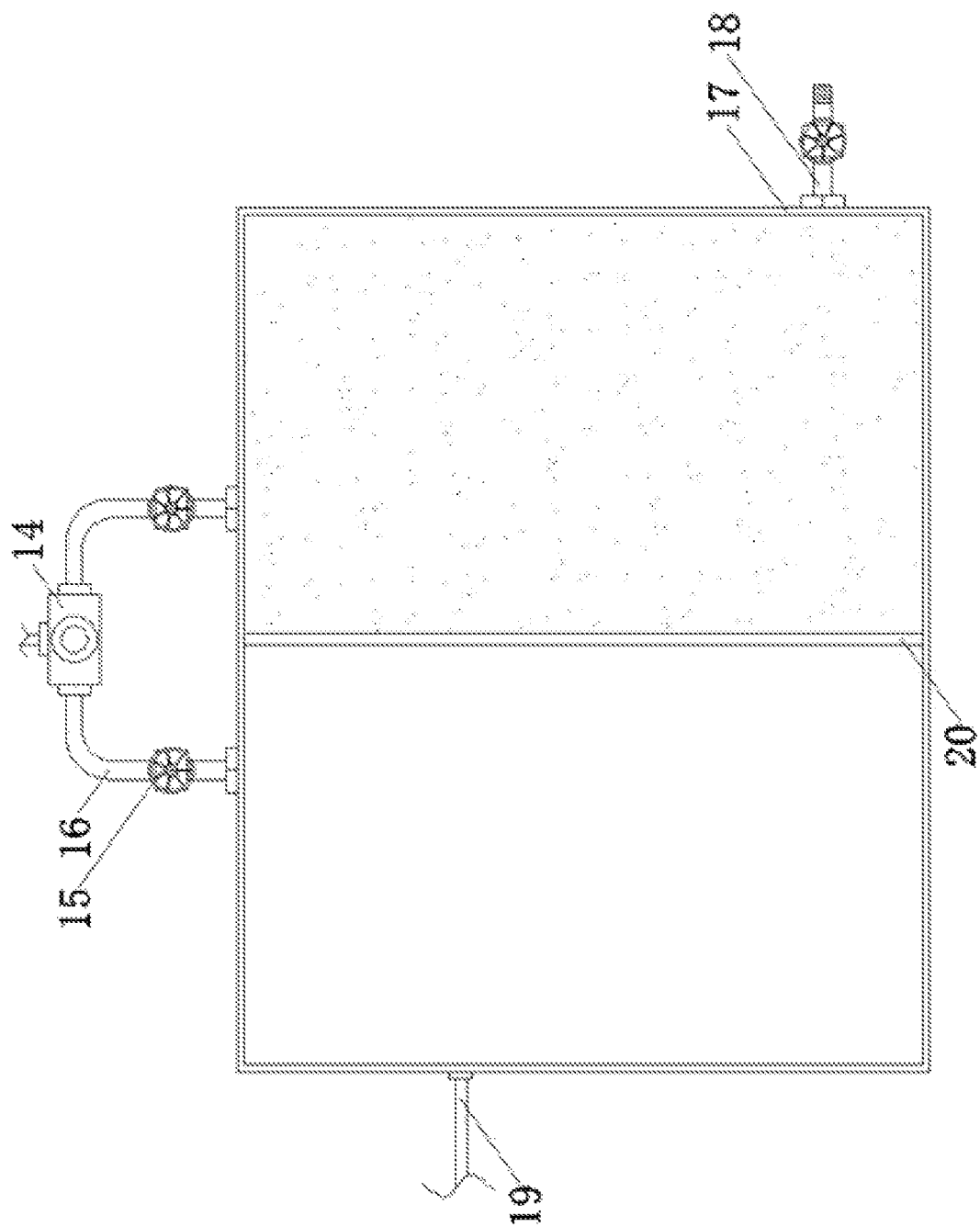
FIG. 3 is a schematic diagram of the internal structure of a water storage tank of a drip irrigation treatment device for recharging domestic sewage into farmland proposed by the present disclosure.
Figure 4:
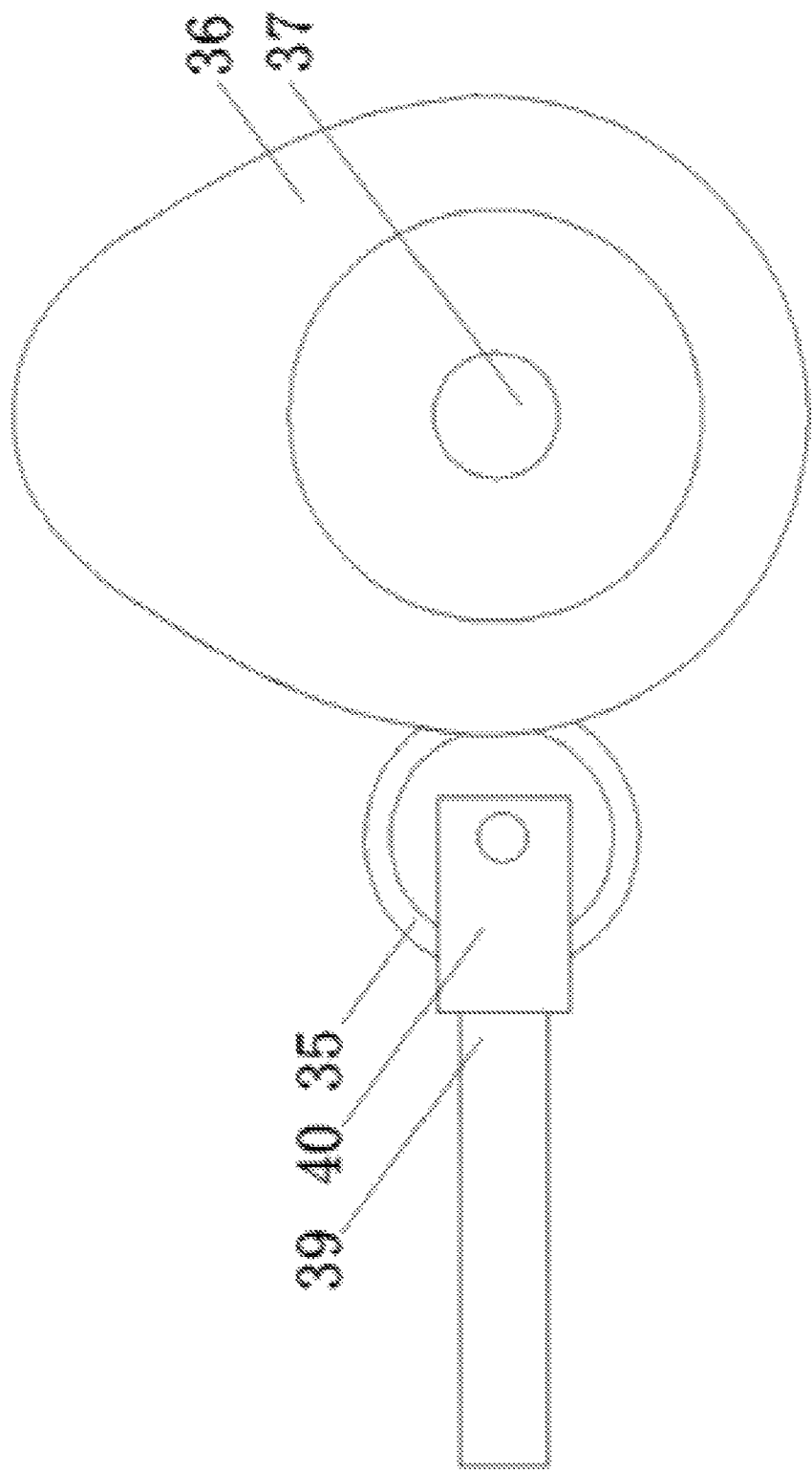
FIG. 4 is a schematic diagram of the mounting structure of a limiting convex block of a drip irrigation treatment device for recharging domestic sewage into farmland proposed by the present disclosure.
Figure 5:
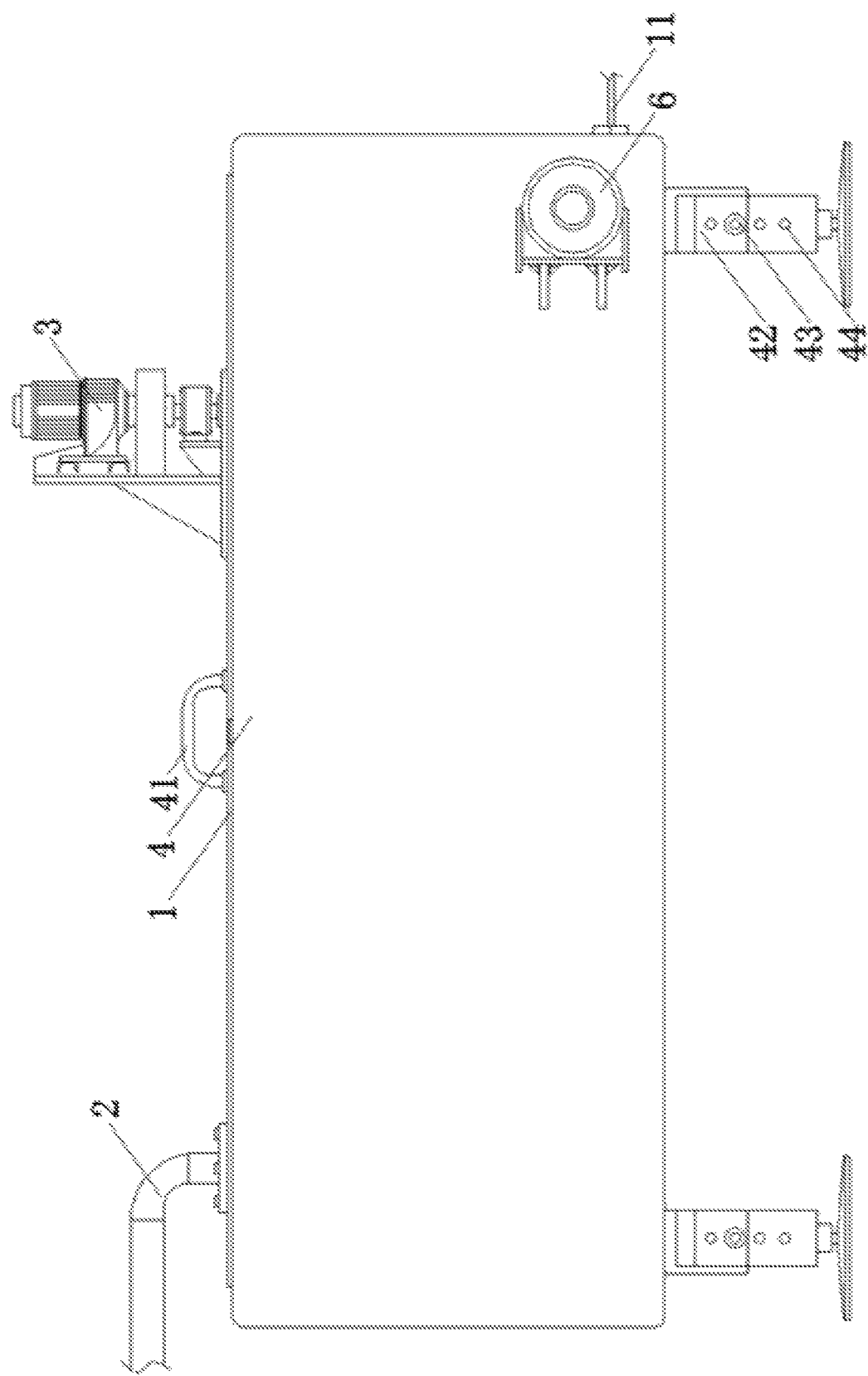
FIG. 5 is a schematic diagram of the external structure of a protection box of a drip irrigation treatment device for recharging domestic sewage into farmland proposed by the present disclosure.
Figure 6:
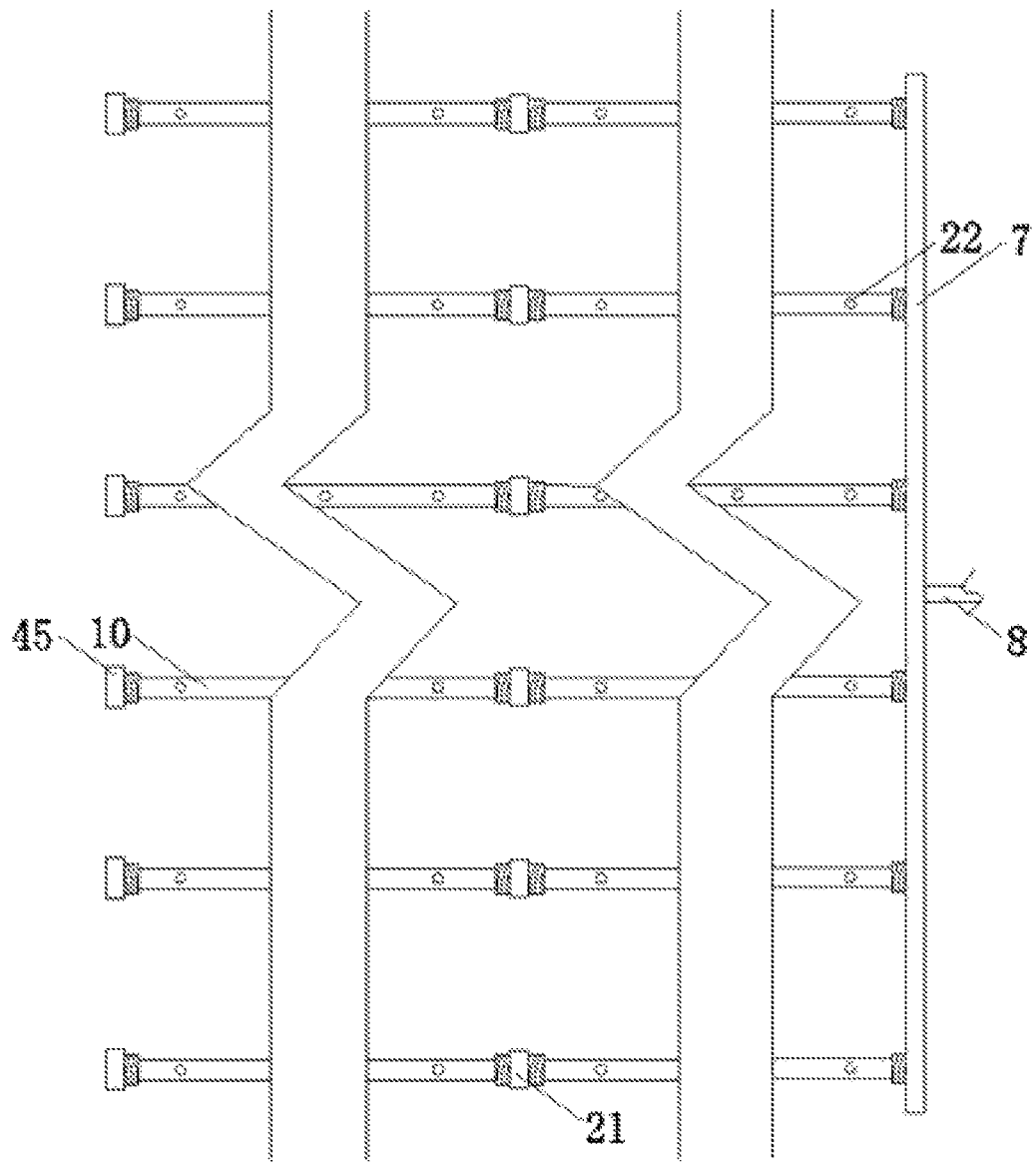
FIG. 6 is a schematic diagram of a mounting structure of spray pipes of a drip irrigation treatment device for recharging domestic sewage into farmland proposed by the present disclosure.
Figure 7:
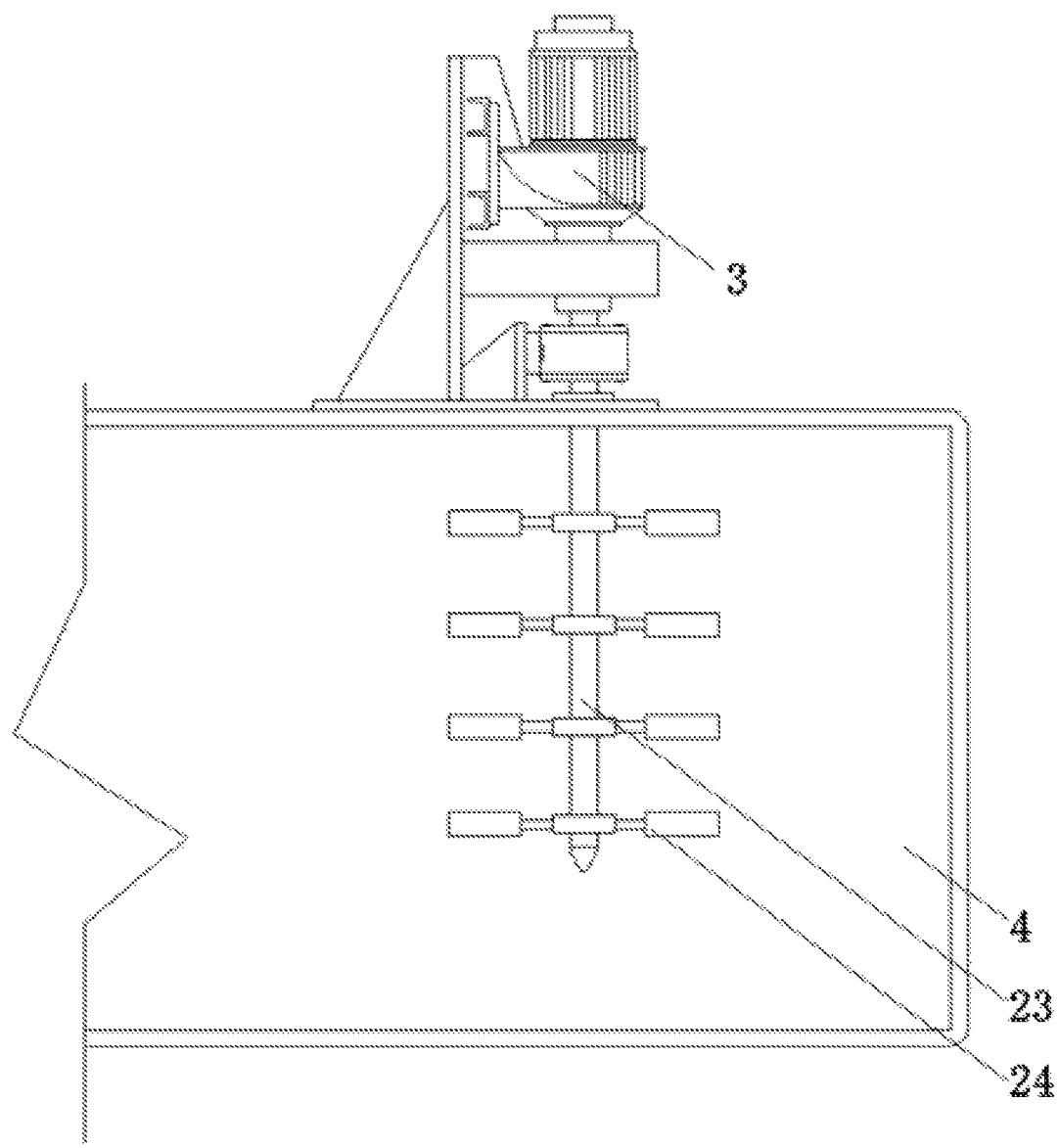
FIG. 7 is a structural schematic diagram of stirring equipment of a drip irrigation treatment device for recharging domestic sewage into farmland proposed by the present disclosure.

Referring to FIG. 1 to FIG. 7, a drip irrigation treatment device for recharging domestic sewage into farmland comprises a water storage tank 17, wherein a partition plate 20 is arranged in the water storage tank 17 and divides the water storage tank 17 into a conveying cavity and a purifying cavity, one side of the conveying cavity and one side of the purifying cavity are jointly connected with a first water conveying mechanism, a protection box 4 is arranged on one side of the water storage tank 17, a filter box 29 is arranged in the protection box 4, one side of the upper end of the protection box 4 is connected with a sewage conveying pipe 2, the lower end of the sewage conveying pipe 2 corresponds to the filter box 29, a filtering mechanism is arranged in the filter box 29, a buffer moving mechanism is arranged on the periphery of the filter box 29, a rotating mechanism is arranged on one side in the protection box 4 and connected with the protection box 4, stirring equipment is mounted at the upper end of the protection box 4, the lower end of the stirring device extends into the filter box 29, one end of the first water conveying mechanism is connected to one side of the filter box 29, one side of the conveying cavity is connected with a second water conveying mechanism, and one end of the second water conveying mechanism is connected with drip irrigation equipment, so that the rural ecological environment is guaranteed, water resources are greatly saved, and sustainable development is achieved.

In the present disclosure, the first water conveying mechanism comprises bent pipes 16 connected to one side of the conveying cavity and one side of the purifying cavity, one end of each of the two bent pipes 16 is jointly connected with a three-way connector 14, one end of the three-way connector 14 is connected with a second water pump 12 through a second connecting pipe 13, one end of the second water pump 12 is connected with a hose 11, and one end of the hose 11 penetrates through the side wall of the protection box 4 and is connected to one side of the filter box 29. Through the arrangement of the hose 11, pipelines are prevented from being broken during swinging, the second water pump 12 is a multi-stage centrifugal pump, the flow is 3.7-1350 m$^3$/h, and the motor power is 3-1120 kw.

In the present disclosure, the rotating mechanism comprises a rotating rod 37 rotationally connected to one side of the protection box 4, a second driving motor 6 is mounted on one side of the protection box 4, the tail end of an output shaft of the second driving motor 6 is connected to one end of the rotating rod 37 through a coupler, two limiting convex blocks 36 are fixedly arranged on the rotating rod 37 in a sleeving mode, two transverse rods 39 are fixed to one side of the filter box 29, a fixed part 40 is fixed to one end of the transverse rod 39, a rotating wheel 35 is rotationally connected to the fixed part 40, and the limiting convex block 36 on the same side abuts against one side of the rotating wheel 35 on the same side. The limiting convex block 36 abuts against the rotating wheel 35, so that reciprocating swing is realized.

In the present disclosure, the buffer moving mechanism comprises connecting blocks 34 fixed to the two sides of the filter box 29, a sliding block 33 is fixed to one side of the connecting block 34, guide rails 32 are arranged on opposite side walls in the protection box 4, the sliding block 33 on the same side is mounted on the guide rail 32 on the same side, a fixed plate 25 is fixed between the opposite side walls in the protection box 4, two guide rods 26 are fixed to one side of the filter box 29, the guide rods 26 penetrate through the fixed plate 25 and extend to one side of the fixed plate 25, the guide rod 26 is sleeved with a spring 27, one end of the spring 27 abuts against one side of the fixed plate 25, and the other ends of the springs 27 abut against one side of the filter box 29. When the filter box 29 reciprocates, buffering is carried out, and meanwhile the swing effect can be improved.

In the present disclosure, the stirring equipment comprises a first driving motor 3 fixed at the upper end of the protection box 4, the tail end of an output shaft of the first driving motor 3 is connected with a stirring rod 23, the lower end of the stirring rod 23 penetrates through the side wall of the protection box 4 and extends into the filter box 29, and a plurality of stirring blades 24 are fixed on the side wall of the periphery of the stirring rod 23 at equal intervals. The stirring equipment is combined with reciprocating swing, so that the mixing and stirring efficiency and quality are greatly improved.

In the present disclosure, the filtering mechanism comprises two baffle plates 31 fixed between opposite side walls in the filter box 29, the two baffle plates 31 divide the interior of the filter box 29 into a filtering cavity, a mounting cavity and a stirring cavity, a first filter screen 28 and a second filter screen 30 are fixed between opposite side walls in the filtering cavity, a third water pump 38 is mounted in the mounting cavity, one end of the third water pump 38 is connected to one side of the filtering cavity, and the other end of the third water pump 38 is connected to one side of the stirring cavity. Filtering is carried out during reciprocating swing, the filtering effect can be effectively improved, the filtering speed can be guaranteed, meanwhile, the filter screens can be prevented from being blocked, the third water pump 38 is a multi-stage centrifugal pump, the flow is 3.7-1350 m$^3$/h, and the motor power is 3-1120 kw.

In the present disclosure, the second water conveying mechanism comprises a third connecting pipe 19 connected to one side of the conveying cavity, one end of the third connecting pipe 19 is connected with a first water pump 9, and one end of the first water pump 9 is connected with a first connecting pipe 8. The second water conveying mechanism is used for continuously conveying water, so that the stability of a water source is ensured.

In the present disclosure, the drip irrigation equipment comprises a fixed pipe 7 connected to one end of the first connecting pipe 8, one end of the fixed pipe 7 is in threaded sleeve connection with a plurality of spray pipes 10 at equal intervals, one end of each of the spray pipes 10 is in threaded sleeve connection with a connector 21, one end of the connector 21 is in threaded sleeve connection with another spray pipe 10, one end of the spray pipe 10 is in threaded sleeve connection with a closed connector 45, and a plurality of spray holes 22 are formed in the spray pipe 10 at equal intervals. The drip irrigation equipment is used for drop irrigation of crops, the length of the spray pipe 10 can be selected according to needs, and meanwhile the distance of the spray pipes 10 can be selected.

In the present disclosure, clamping blocks are fixed to four corners of the lower end of the protection box 4 respectively, an opening is formed in one side of the clamping block, a supporting block 42 is arranged in the opening in a penetrating mode, a cushion block is fixed to the lower end of the supporting block 42, a plurality of mounting holes 44 are formed in one side of the supporting block 42 at equal intervals, a bolt 43 is arranged on one side of the clamping block in a penetrating mode, and one end of the bolt 43 extends into one of the mounting holes 44. The protection box 4 can be conveniently supported at a proper height as required.

In the present disclosure, a sealing cover 1 is hinged to one side of the upper end of the protection box 4, a handle 41 is fixed to the upper end of the sealing cover 1, a feeding cover 5 is hinged to the other side of the upper end of the protection box 4, the lower end of the feeding cover 5 corresponds to the stirring cavity, a sand filter layer is arranged in the purifying cavity, and a drainage pipe 18 is connected to one side of the purifying cavity. Three types of surface water purified by the sand filter layer can be conveniently and directly discharged into the soil layer or rivers without polluting soil and the water source.

In the present disclosure, when domestic sewage needs to be treated, domestic sewage in main pipelines is fed into the filtering cavity in the filter box 29, large particles and small impurities are blocked and isolated respectively through full filtration of the first filter screen 28 and the second filter screen 30, and then water with the impurities filtered out is fed into the stirring cavity through the third water pump 38; the first driving motor 3 is started, the first driving motor 3 drives the stirring rod 23 and stirring blades 24 to rotate through rotation of the output shaft; meanwhile, the feeding cover 5 is opened, a corresponding sewage purifying agent is fed for full mixing and stirring, stirring is carried out for 30-50 minutes, the second driving motor 6 drives the rotating rod 37 to rotate through rotation of the output shaft while stirring and filtering through the filter screens are carried out, then the two limiting convex blocks 36 are driven to rotate, and the rotating wheels 35 are driven to rotate along with continuous rotation of the limiting convex blocks 36; due to the fact that the limiting convex blocks 36 are in the mode that one end of on limiting convex block 36 is long and the other end of the other limiting convex block 36 is short; therefore, under continuous rotation, the filter box 29 can be driven to move in a reciprocating mode, the second water pump 12 is started to convey purified water; when corresponding crops need to be irrigated, the closed valve 15 on one bent pipe 16 is opened, the other bent pipe 16 is closed, water flows into the conveying cavity, then the water is conveyed into the corresponding spray pipe 10 through the first water pump 9, the mounting length of the spray pipe 10 is selected according to the needs of crops, then drip irrigation is carried out, and when the crops do not need to be irrigated, the water source is put into the purifying cavity; and the sand filter layer in the purifying cavity adsorbs and filters the water source again, and then water is discharged into three types of surface water which is discharged into the rivers for backflow.

The above mentioned are only preferred specific embodiments of the present disclosure. However, the scope of protection of the present disclosure is not limited to the embodiments described herein. Any technicians skilled in the technical field are within the technical scope disclosed by the present disclosure; and any replacements or modifications according to the technical schemes of the present disclosure and ideas thereof all shall be included in the scope of protection of the present disclosure.

What is claimed is:

1. A drip irrigation treatment device for recharging domestic sewage into farmland, comprising a water storage tank, wherein a partition plate is arranged in the water storage tank and divides the water storage tank into a conveying cavity and a purifying cavity, one side of the conveying cavity and one side of the purifying cavity are jointly connected with a first water conveying mechanism, a protection box is arranged on one side of the water storage tank, a filter box is arranged in the protection box, one side of an upper end of the protection box is connected with a sewage conveying pipe, a lower end of the sewage conveying pipe corresponds to the filter box, a filtering mechanism is arranged in the filter box, a buffer moving mechanism is arranged on a periphery of the filter box, a rotating mechanism is arranged on one side in the protection box and connected with the protection box, stirring equipment is mounted at the upper end of the protection box, a lower end of the stirring equipment extends into the filter box, one end of the first water conveying mechanism is connected to one side of the filter box, one side of the conveying cavity is connected with a second water conveying mechanism, and one end of the second water conveying mechanism is connected with drip irrigation equipment;

the first water conveying mechanism comprises curved pipes connected to one side of the conveying cavity and one side of the purifying cavity, one end of each of the curved pipes is jointly connected with a three-way connector, one end of the three-way connector is connected with a second water pump through a second connecting pipe, one end of the second water pump is connected with a hose, and one end of the hose penetrates through a side wall of the protection box and is connected to one side of the filter box;

the buffer moving mechanism comprises connecting blocks fixed to two sides of the filter box, a sliding block is fixed to one side of the connecting block, guide rails are arranged on corresponding side walls in the protection box, the sliding block is mounted on the guide rail on a same side as the sliding block, a fixed plate is fixed between the opposite side walls in the protection box, two guide rods are fixed to one side of the filter box, the guide rods penetrate through the fixed plate and extend to one side of the fixed plate, the guide rod is sleeved with a spring, one end of the spring abuts against one side of the fixed plate, and another end of the spring abuts against one side of the filter box;

the filtering mechanism comprises two baffle plates fixed between opposite side walls in the filter box, the two baffle plates divide the interior of the filter box into a filtering cavity, a mounting cavity and a stirring cavity, a first filter screen and a second filter screen are fixed between opposite side walls in the filtering cavity, a third water pump is mounted in the mounting cavity, one end of the third water pump is connected to one side of the filtering cavity, and the other end of the third water pump is connected to one side of the stirring cavity; and the rotating mechanism comprises a rotating rod rotationally connected to one side of the protection box, a second driving motor is mounted on one side of the protection box, a tail end of an output shaft of the second driving motor is connected to one end of the rotating rod through a coupler, two limiting convex blocks are fixedly arranged on the rotating rod in a sleeving mode, two transverse rods are fixed to one side of the filter box, a fixed part is fixed to one end of the transverse rod, a rotating wheel is rotationally connected to the fixed part, and the limiting convex block abuts against one side of the rotating wheel on a same side as the limiting convex block.

2. The drip irrigation treatment device for recharging domestic sewage into farmland according to claim 1, wherein the stirring equipment comprises a first driving motor fixed at the upper end of the protection box, the tail end of an output shaft of the first driving motor is connected with a stirring rod, a lower end of the stirring rod penetrates through the side wall of the protection box and extends into the filter box, and a plurality of stirring blades are fixed on a side wall of a periphery of the stirring rod at equal intervals.

3. The drip irrigation treatment device for recharging domestic sewage into farmland according to claim 1, wherein the second water conveying mechanism comprises a third connecting pipe connected to one side of the conveying cavity, one end of the third connecting pipe is connected with a first water pump, and one end of the first water pump is connected with a first connecting pipe.

4. The drip irrigation treatment device for recharging domestic sewage into farmland according to claim 3, wherein the drip irrigation equipment comprises a fixed pipe connected to one end of the first connecting pipe, one end of the fixed pipe is in threaded sleeve connection with a plurality of spray pipes at equal intervals, one end of each of the spray pipes is in threaded sleeve connection with a connector, one end of the connector is in threaded sleeve connection with another spray pipe, one end of the spray pipe is in threaded sleeve connection with a closed connector, and a plurality of spray holes are formed in the spray pipe at equal intervals.

5. The drip irrigation treatment device for recharging domestic sewage into farmland according to claim 1, wherein clamping blocks are fixed to four corners of a lower end of the protection box respectively, an opening is formed in one side of the clamping block, a supporting block is arranged in the opening in a penetrating mode, a cushion block is fixed to the lower end of the supporting block, a plurality of mounting holes are formed in one side of the supporting block at equal intervals, a bolt is arranged on one side of the clamping block in a penetrating mode, and one end of the bolt extends into one of the mounting holes.

6. The drip irrigation treatment device for recharging domestic sewage into farmland according to claim 1, wherein a sealing cover is hinged to one side of the upper end of the protection box, a handle is fixed to an upper end of the sealing cover, a feeding cover is hinged to the other side of the upper end of the protection box, the lower end of the feeding cover corresponds to the stirring cavity, a sand filter layer is arranged in the purifying cavity, and a drainage pipe is connected to one side of the purifying cavity.

\* \* \* \* \*